(12) United States Patent
Fluck et al.

(10) Patent No.: US 9,045,612 B2
(45) Date of Patent: Jun. 2, 2015

(54) SYSTEMS AND METHODS FOR POLYSTYRENE FOAM RECYCLING USING BRANCHED DIBASIC ESTERS

(71) Applicant: Rhodia Operations, Aubervilliers (FR)

(72) Inventors: David Fluck, Elkton, MD (US); Ruela Pabalan, Burlington, NJ (US); Charles Aymes, Monmouth Junction, NJ (US)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 13/738,031

(22) Filed: Jan. 10, 2013

(65) Prior Publication Data

US 2014/0031472 A1    Jan. 30, 2014

Related U.S. Application Data

(60) Provisional application No. 61/584,852, filed on Jan. 10, 2012.

(51) Int. Cl.
| | | |
|---|---|---|
| *C08J 11/08* | (2006.01) | |
| *C08K 5/11* | (2006.01) | |
| *C08J 11/06* | (2006.01) | |
| *C08J 9/38* | (2006.01) | |
| *C08J 11/14* | (2006.01) | |

(52) U.S. Cl.
CPC ...... *C08J 11/08* (2013.01); *C08J 11/14* (2013.01); *C08K 5/11* (2013.01); *C08J 11/06* (2013.01); *C08J 2325/06* (2013.01); *C08J 9/38* (2013.01)

(58) Field of Classification Search
CPC ............... C08J 11/26; C08J 9/38; C08J 11/04
USPC .......................................................... 516/113
See application file for complete search history.

(56) References Cited

U.S. PATENT DOCUMENTS

| | | | |
|---|---|---|---|
| 5,223,543 A | 6/1993 | Iovino | |
| 6,743,828 B1 | 6/2004 | Katz et al. | |
| 7,241,858 B2 | 7/2007 | Katz et al. | |
| 7,321,003 B2 | 1/2008 | Katz et al. | |
| 7,476,696 B2 | 1/2009 | Katz et al. | |
| 8,445,552 B2 * | 5/2013 | O'Brien et al. | 521/40 |
| 8,628,626 B2 * | 1/2014 | Fluck et al. | 134/39 |
| 2009/0281012 A1 * | 11/2009 | Trivedi et al. | 510/138 |
| 2010/0273695 A1 * | 10/2010 | Sehgal et al. | 510/174 |
| 2011/0039749 A1 * | 2/2011 | Fluck et al. | 510/188 |
| 2011/0088728 A1 * | 4/2011 | Sehgal et al. | 134/26 |
| 2012/0043694 A1 * | 2/2012 | Kagitani et al. | 264/219 |
| 2012/0129756 A1 * | 5/2012 | Sehgal et al. | 510/417 |

FOREIGN PATENT DOCUMENTS

| | | |
|---|---|---|
| JP | 09-165465 A | 6/1997 |
| JP | 10-316797 A | 12/1998 |
| JP | 2000-355636 A | 12/2000 |
| WO | WO 02/48246 A1 | 6/2002 |
| WO | WO-2010117022 A1 * | 10/2012 |

* cited by examiner

*Primary Examiner* — Melissa Rioja

(57) ABSTRACT

Methods and systems for reducing the volume of polystyrene foam wherein a foam reducing agent is applied to the foam, the foam reducing agent in some embodiments comprising a branched dibasic ester blend.

7 Claims, 1 Drawing Sheet

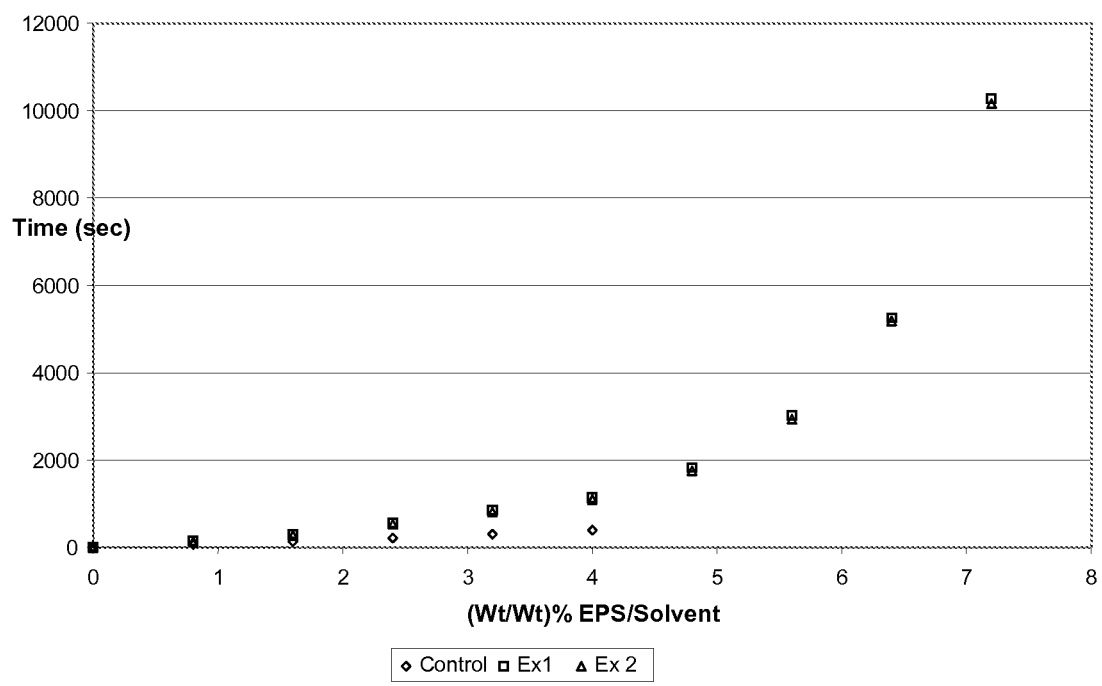

SYSTEMS AND METHODS FOR POLYSTYRENE FOAM RECYCLING USING BRANCHED DIBASIC ESTERS

CROSS-REFERENCE TO RELATED APPLICATIONS

This application claims the benefit of U.S. Provisional Application Ser. No. 61/584,852, filed on Jan. 10, 2012, herein incorporated by reference.

FIELD OF INVENTION

This invention relates to systems and methods for reducing the volume of polystyrene foam and, in particular, reducing the volume of polystyrene foam using branched dibasic esters, wherein the system and methods of the invention are suitable in recycling applications among others.

BACKGROUND OF THE INVENTION

Polystyrene foam, such as expanded polystyrene (EPS), has many industrial applications, for example, in the food industry as cups and containers. However, such polystyrene-based products suffer from significant drawbacks such as uneconomical recycling as well as lack of biodegradability. Polystyrene foam, and especially expanded polystyrene foam, creates a recycling issue due to its low bulk density. Transporting polystyrene foam to a recycling plant becomes quite expensive, since polystyrene foam takes a lot of space per weight because of its low bulk density. The waste polystyrene foam is transported, usually by truck, from the restaurant to waste facility. However, given the large volume of polystyrene foam and EPS relative to its weight, transportation becomes extremely inefficient (as only a fraction of the maximum weight capacity of the truck is utilized). This results in significantly more costs (fuel, time, etc.) in transporting the same weight of EPS as compared to regular waste.

Others have tried to solve this problem with limited success. For example, some have tried to compact the polystyrene foam to increase its bulk density, i.e., to lower its volume per weight. However, such methods to compact polystyrene foam are typically very expensive as special equipment is required to recycle polystyrene foam products. Another approach to recycling of EPS is to chemically to reduce the EPS volume. However, there are significant drawbacks utilizing these chemicals as such chemicals can be very hazardous to human health and to the environment, as well as have storage, transportation and stability issues. Other chemicals, for example terpenes, have storage and transportation issues because of their flash point and are highly volatile.

SUMMARY OF THE INVENTION

Reducing the foam volume prior to transportation of the waste product enhances the economics of recycling polystyrene foam. One method is to use a solvent to dissolve the polystyrene foam. This method has two benefits. First it reduces the volume of polystyrene foam, but second it enables recycling/reprocessing once the solvent is removed. In other words, the dissolution becomes an integral part of the recycling process which can begin at the disposal point (e.g., restaurant, event, etc.).

It has been surprisingly discovered that non-linear dibasic esters dissolve significantly more polystyrene foam than linear dibasic esters. This finding is important from a processing and economic perspective, as it would take less solvent to reduce the same amount of polystyrene foam. This finding is also important at point of use operations which can not readily be changed everyday. Non-linear dibasic esters enable higher throughput capacity for both recycling collection point and plant/reprocessing use.

Accordingly, the present invention, in one aspect, is a polystyrene volume foam reducing agent comprising a mixture of: (A) a dibasic ester blend comprising dialkyl methylglutarate and, optionally, at least one of a dialkyl ethylsuccinate, a dialkyl adipate, a dialkyl succinate or a dialkyl glutarate; and (B) optionally, at least one surfactant, whereby the foam reduction agent is capable of decreasing the volume of a polystyrene material or, otherwise, collapsing a polystyrene cell to form a compact gel material. In another embodiment, the dibasic ester blend comprises dialkyl methylglutarate, dialkyl ethylsuccinate and, oprionally, dialkyl adipate In some embodiments, the dibasic ester blend comprises a dialkyl methylglutarate, a dialkyl ethylsuccinate and a dialkyl adipate. The dibasic ester blend can further comprise at least one of dialkyl succinate or dialkyl glutarate, in other embodiments. In some embodiments, the at least one surfactant is selected from the group consisting of a terpene and an alcohol ethoxylate.

In another aspect, the present invention is a method for reducing the volume of polystyrene foam comprising the steps of: contacting a polystyrene volume reducing agent to polystyrene foam, whereby the foam reduction agent is capable of collapsing a polystyrene cell to form a compact gel material.

In one embodiment, the dibasic ester blend is selected from dialkyl methylglutarate, dialkyl ethylsuccinate, dialkyl adipate, dialkyl succinate, dialkyl glutarate or any combination thereof.

BRIEF DESCRIPTION OF DRAWINGS

FIG. 1 is a chart illustrating the dissolution of expanded polystyrene (EPS) in dibasic esters as described herein.

DETAILED DESCRIPTION OF THE INVENTION

As used herein, the term "alkyl" means a saturated or unsaturated straight chain, branched chain, or cyclic hydrocarbon radical, including but not limited to, methyl, ethyl, n-propyl, iso-propyl, n-butyl, sec-butyl, t-butyl, pentyl, n-hexyl, and cyclohexyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, including but not limited to, phenoxy, phenyl, methylphenyl, dimethylphenyl, trimethylphenyl, chlorophenyl, trichloromethylphenyl, aminophenyl, and tristyrylphenyl.

As used herein, the term "alkylene" means a divalent saturated straight or branched chain hydrocarbon radical, such as for example, methylene, dimethylene, trimethylene.

As used herein, the terminology "(Cr—Cs)" in reference to an organic group, wherein r and s are each integers, indicates that the group may contain from r carbon atoms to s carbon atoms per group.

Described herein are novel compositions, systems and methods for reducing the volume of polystyrene foam. The reduction of volume of polystyrene foam can be accomplished through use of a polystyrene volume reducing agent comprising a solvent blend. The solvent blend, in one embodiment, is a dibasic ester blend comprising a mixture of i) a dialkyl methylglutarate and ii) and at least one of a dialkyl ethylsuccinate or a dialkyl adipate. The polystyrene volume reducing agent can comprise additional components, including but not limited to one or more surfactants. The volume reduction agent is capable of collapsing a polystyrene cell to form a compact gel material. i.e., decrease its volume. It is understood that the term "polystyrene" includes any synthetic polymer made from one or more distinct monomeric units, at least one of which is a styrene monomer. In one embodiment, the polystyrene is rigid or foamed.

In one embodiment, the solvent blend is a blend of dibasic esters comprising a mixture of $C_1$-$C_{12}$ dialkyl methylglutarate, $C_1$-$C_{12}$ dialkyl ethylsuccinate, and, optionally, $C_1$-$C_{12}$ dialkyl adipate. In another embodiment, the dibasic ester blend is at least one of: $C_1$-$C_{12}$ dialkyl methylglutarate, $C_1$-$C_{12}$ dialkyl ethylsuccinate and $C_1$-$C_{12}$ dialkyl adipate. In another embodiment, the dibasic ester blend is a mixture of at least two of: $C_1$-$C_{12}$ dialkyl methylglutarate, $C_1$-$C_{12}$ dialkyl ethylsuccinate and $C_1$-$C_{12}$ dialkyl adipate. In another embodiment, the dibasic ester blend is a mixture of at least two of: $C_1$-$C_{12}$ dialkyl methylglutarate, $C_1$-$C_{12}$ dialkyl ethylsuccinate, $C_1$-$C_{12}$ dialkyl glutarate, $C_1$-$C_{12}$ dialkyl succinate and $C_1$-$C_{12}$ dialkyl adipate.

In a further embodiment, the dibasic ester blend is a mixture of: (i) $C_1$-$C_{12}$ dialkyl methylglutarate and (ii) at least one of: $C_1$-$C_{12}$ dialkyl ethylsuccinate, $C_1$-$C_{12}$ dialkyl glutarate, $C_1$-$C_{12}$ dialkyl succinate and $C_1$-$C_{12}$ dialkyl adipate. In some specific embodiments, the dibasic ester blend is a mixture of: (i) $C_1$-$C_{12}$ dialkyl methylglutarate and (ii) $C_1$-$C_{12}$ dialkyl ethylsuccinate.

It is understood that in any of the embodiments mentioned herein, and in particular the aforementioned paragraph, the $C_1$-$C_{12}$ group can include, in one embodiment, a $C_1$-$C_{10}$ group. In other embodiments, the $C_1$-$C_{12}$ group includes a $C_1$-$C_8$ group, a $C_1$-$C_6$ group, a $C_1$-$C_5$ group, a $C_1$-$C_4$ group, a $C_2$-$C_{12}$ group, a $C_3$-$C_{12}$ group, a $C_4$-$C_{12}$ group, a $C_5$-$C_{12}$ group, and/or a $C_5$-$C_{10}$ group. For example, the dibasic ester blend can be, in a particular embodiment, a mixture of $C_1$-$C_6$ dialkyl methylglutarate, $C_1$-$C_6$ dialkyl ethylsuccinate, and, optionally, $C_1$-$C_6$ dialkyl adipate.

In another embodiment, the blend is a mixture of: dialkyl 2-methylglutarate present from about 70-95 wt %, more typically, 80-92 wt %, more typically from about 86-90 wt % (by weight of blend), dialkyl ethylsuccinate present from about 3-20 wt %, more typically from about 5-15 wt % (by weight of blend), more typically from about 9-11 wt % (by weight of blend), and, dialkyl adipate present from about 0-2.5 wt %, more typically, 0-1 wt % (by weight of blend). In some embodiments, the dialkyl group is a dimethyl group, in other embodiments, the dialkyl group is a diethyl group, which in other embodiments is a dipropyl group or diamyl group or iso-amyl group.

In one embodiment, the solvent blend comprises (i) one or a (ii) blend of dibasic esters. In one embodiment, the blend comprises adducts of alcohol and linear diacids, the adducts having the formula $R_1$—OOC-A-COO—$R_2$ wherein $R_1$ and/or $R_2$ comprise, individually, a $C_1$-$C_{12}$ alkyl, more typically a $C_1$-$C_8$ alkyl, and A comprises a mixture of —$(CH_2)_4$—, —$(CH_2)_3$—, and —$(CH_2)_2$—. In another embodiment, $R_1$ and/or $R_2$ comprise, individually, a $C_4$-$C_{12}$ alkyl, more typically a $C_4$-$C_8$ alkyl. In one embodiment, $R_1$ and $R_2$ can individually comprise a hydrocarbon group originating from fusel oil. In one embodiment, $R_1$ and $R_2$ individually can comprise a hydrocarbon group having 1 to 8 carbon atoms. In one embodiment, $R_1$ and $R_2$ individually can comprise a hydrocarbon group having 5 to 8 carbon atoms. In another embodiment, A comprises a least one, typically at least two, of: —$(CH_2)_4$—, —$CH_2CH_2CH(CH_3)$—, —$CH_2CH(C_2H_5)$—, —$(CH_2)_4$—, —$CH_2CH_2CH(CH_3)$—, or —$CH_2CH(C_2H_5)$—.

In one embodiment, the blend comprises adducts of alcohol and branched or linear diacids, the adducts having the formula $R_1$—OOC-A-COO—$R_2$ wherein $R_1$ and/or $R_2$ comprise, individually, a $C_1$-$C_{12}$ alkyl, more typically a $C_1$-$C_8$ alkyl, and A comprises a mixture of —$(CH_2)_4$—, —$CH_2CH_2CH(CH_3)$—, and —$CH_2CH(C_2H_5)$—. In another embodiment, $R_1$ and/or $R_2$ comprise, individually, a $C_4$-$C_{12}$ alkyl, more typically a $C_4$-$C_8$ alkyl. It is understood that the acid portion may be derived from such dibasic acids such as adipic, succinic, glutaric, oxalic, malonic, pimelic, suberic and azelaic acids, as well as mixtures thereof.

The dibasic esters of the present invention can be obtained by a process comprising an "esterification" stage by reaction of a diacid of formula HOOC-A-COOH or of a diester of formula MeOOC-A-COOMe with a branched alcohol or a mixture of alcohols. The reactions can be appropriately catalyzed. Use is preferably made of at least 2 molar equivalents of alcohols per diacid or diester. The reactions can, if appropriate, be promoted by extraction of the reaction by-products and followed by stages of filtration and/or of purification, for example by distillation.

The diacids in the form of mixtures can in particular be obtained from a mixture of dinitrile compounds in particular produced and recovered in the process for the manufacture of adiponitrile by double hydrocyanation of butadiene. This process, used on a large scale industrially to produce the greater majority of the adiponitrile consumed worldwide, is described in numerous patents and works. The reaction for the hydrocyanation of butadiene results predominantly in the formulation of linear dinitriles but also in formation of branched dinitriles, the two main ones of which are methylglutaronitrile and ethylsuccinonitrile. The branched dinitrile compounds are separated by distillation and recovered, for example, as top fraction in a distillation column, in the stages for separation and purification of the adiponitrile. The branched dinitriles can subsequently be converted to diacids or diesters (either to light diesters, for a subsequent transesterification reaction with the alcohol or the mixture of alcohols or the fusel oil, or directly to diesters in accordance with the invention).

Dibasic esters may be derived from one or more by-products in the production of polyamide, for example, polyamide 6,6. In one embodiment, the cleaning composition comprises a blend of linear or branched, cyclic or noncyclic, $C_1$-$C_{20}$ alkyl, aryl, alkylaryl or arylalkyl esters of adipic diacids, glutaric diacids, and succinic diacids. In another embodiment, the cleaning composition comprises a blend of linear or branched, cyclic or noncyclic, $C_1$-$C_{20}$ alkyl, aryl, alkylaryl or arylalkyl esters of adipic diacids, methylglutaric diacids, and ethylsuccinic diacids Generally, polyamide is a copolymer prepared by a condensation reaction formed by reacting a diamine and a dicarboxylic acid. Specifically, polyamide 6,6 is a copolymer prepared by a condensation reaction formed by reacting a diamine, typically hexamethylenediamine, with a dicarboxylic acid, typically adipic acid.

In one embodiment, the blend of dibasic esters can be derived from one or more by-products in the reaction, synthesis and/or production of adipic acid utilized in the production of polyamide, the cleaning composition comprising a blend of dialkyl esters of adipic diacids, glutaric diacids, and succinic diacids (herein referred to sometimes as "AGS" or the "AGS blend").

In one embodiment, the blend of esters is derived from by-products in the reaction, synthesis and/or production of hexamethylenediamine utilized in the production of polyamide, typically polyamide 6,6. The cleaning composition comprises a blend of dialkyl esters of adipic diacids, methylglutaric diacids, and ethylsuccinic diacids (herein referred to sometimes as "MGA", "MGN", "MGN blend" or "MGA blend").

In certain embodiments, the dibasic ester blend comprises:
a diester of formula I:

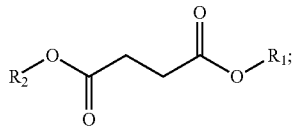

(I)

a diester of formula II:

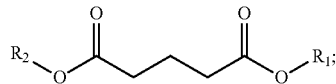

(II)

and
a diester of formula III:

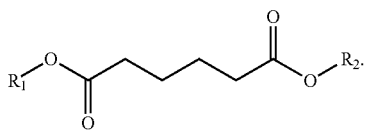

(III)

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl or octyl. In such embodiments, the blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula III. The blend is generally characterized by a flash point of 98° C., a vapor pressure at 20° C. of less than about 10 Pa, and a distillation temperature range of about 200-300° C. Mention may also be made of Rhodiasolv® RPDE (Rhodia Inc., Cranbury, N.J.), Rhodiasolv® DIB (Rhodia Inc., Cranbury, N.J.) and Rhodiasolv® DEE (Rhodia Inc., Cranbury, N.J.).

In certain other embodiments, the dibasic ester blend comprises:
a diester of the formula IV:

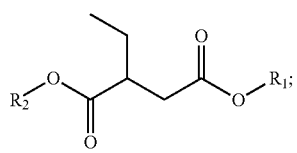

(IV)

a diester of the formula V:

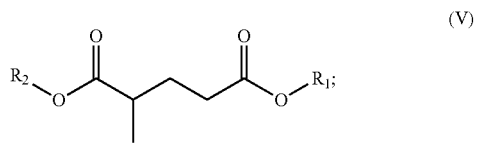

(V)

and, optionally,
a diester of the formula VI:

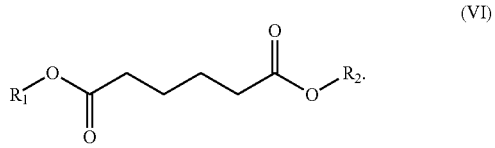

(VI)

$R_1$ and/or $R_2$ can individually comprise a hydrocarbon having from about 1 to about 8 carbon atoms, typically, methyl, ethyl, propyl, isopropyl, butyl, isobutyl, n-butyl, isoamyl, hexyl, heptyl, or octyl. In such embodiments, the blend typically comprises (by weight of the blend) (i) from about 5% to about 30% of the diester of formula IV, (ii) from about 70% to about 95% of the diester of formula V, and (iii) from about 0% to about 10% of the diester of formula VI. More typically, the blend typically comprises (by weight of the blend): (i) from about 6% to about 12% of the diester of formula IV, (ii) from about 86% to about 92% of the diester of formula V, and (iii) from about 0.5% to about 4% of the diester of formula VI.

Most typically, the blend comprises (by weight of the blend): (i) about 9% of the diester of formula IV, (ii) about 89% of the diester of formula V, and (iii) about 1% of the diester of formula VI. The blend is generally characterized by a flash point of of 98° C., a vapor pressure at 20° C. of less than about 10 Pa, and a distillation temperature range of about 200-275° C. Mention may be made of Rhodiasolv® IRIS and Rhodiasolv® DEE/M, manufactured by Rhodia Inc. (manufactured by Rhodia Inc., Cranbury, N.J.).

In one embodiment, the dibasic ester blend comprises one or more of any of the dibasic esters of: formula (I), formula (II), formula (III), formula (IV), formula (V), and/or formula (VI), in any percentage. In one embodiment the dibasic ester blend comprises one or more of any branched dibasic esters, which in one specific embodiment is dialkyl methyl glutarate.

In another embodiment, the solvent blend or solvent blend can include other solvents or mixtures thereof, including but not limited to aliphatic or acyclic hydrocarbons solvents, halogenated solvents, aromatic hydrocarbon solvents, cyclic terpenes, unsaturated hydrocarbon solvents, halocarbon solvents, polyols, alcohols including water-soluble alcohols, ketones or aldehydes such as ethanol, methanol, 1- or 2-propanol, tert-butanol, acetone, methyl ethyl ketone, acetaldehyde, propionaldehyde, ethylene glycol, propylene glycol, alkoxy ethylene glycols and propylene glycols such as 2-methoxyethanol, 2-butoxyethanol, diethyleneglycol, 2-ethoxyethanol, and the like.

The polystyrene volume reducing agent can comprise additional components, including but not limited to one or more surfactants. In some embodiments, surfactants can be one or more anionic surfactants, one or more cationic surfactants, one or more non-ionic surfactants, one or more zwitterionic surfactants, one or more amphoteric surfactants or any combination thereof.

The surfactant can be any number of amphoteric, cationic, anionic or nonionic surfactants or a blend of surfactants. In one embodiment, the surfactant a nonionic surfactant, typically, an alcohol ethoxylate, an alkyl phenol ethoxylate or a terpene alkoxylate. More typically, the surfactant is a C7-C12 alcohol ethoxylate, e.g., Rhodasurf 91-6 surfactant manufactured by Rhodia Inc. (Cranbury, N.J.), and most typically, the surfactant is a C9-C11 linear alcohol ethoxylate.

In other embodiments, additional components in the polystyrene volume reducing agent can comprise a terpene, terpene EO/PO, pinene or derivative thereof, as well as additives such as fragrances and solubilizers, pH adjusting agents, whiteners, delaminates, opacifying agent, anti-corrosion agents, anti-foaming agents, coloring agents, stabilizers and thickener.

Described herein are methods for reducing the volume of polystyrene foam comprising the steps of: contacting a volume reducing agent to polystyrene foam, whereby the foam reduction agent is capable of collapsing a polystyrene cell to form a compact gel material.

In one embodiment, the volume reducing agent comprises branched dibasic esters with optional additives, such as surfactants and the like. In a condensed, higher density form, the polystyrene foam is can be efficiently transported, as the volume of material per weight is decreased significantly allowing more polystyrene material to be transported at a given time. Further, in its dispersed form (i.e., in solvent), the polystyrene foam can further be more easily processed during, for example, recycling and the like. The polystyrene in its dispersed form is capable of being pumped, which offers advantages in processing.

In one embodiment, the solvent blend is made up of branched dibasic esters, which are environmentally friendly, readily biodegradable, non-toxic and/or non-flammable, and are generally safer to handle than typical solvents utilized. Other solvents such as acetone, butyl acetate and like are hazardous and have high vapor pressures, thus more easily evaporate making them a less than ideal solvent for dissolving polystyrene and maintaining the polystyrene in sludge or gel form for extended periods of time, for example, during transportation. Thus, the volume reducing agents/compositions described herein address the problems of readily evaporation of traditional, toxic and highly volatile industrial solvents.

Further, the polystyrene volume reducing agent is more environmentally friendly that traditional solvents such as acetone and butyl acetate, and thus would not have as great of a negative environmental impact as such traditional industrial solvents.

In one embodiment, heat is added to the process of to increase the capacity of polystyrene in the solvent and/or increase the rate at which the polystyrene is dissolved. The solvents used in the process can be separated or filtered from the polystyrene during processing, e.g., recycling process.

In one embodiment, the polystyrene is torn, cut, shredded, sliced or otherwise made or converted into smaller pieces prior to contacting with the volume reducing agents or compositions described herein. In other embodiments, the polystyrene is torn, cut, shredded, sliced or otherwise made into smaller pieces after contacting with the volume reducing agents or compositions described herein.

The polystyrene can be added to a container charged with the volume reducing agent. In another embodiment, the polystyrene is contacted with the volume reducing agent through spraying or otherwise and then placed in the container. In other embodiments, the polystyrene is placed in the container, then contacted with the volume reducing agent or composition described herein by spraying or other means. The volume reducing agent promotes reduction of the volume of polystyrene once in contact with the polystyrene.

EXPERIMENTS

Dissolution experiments were performed on polystyrene foam (EPs) using both linear dibasic esters (Control) and non-linear or predominately non-linear dibasic esters (Ex 1 and Ex 2). Ex 1 contains dimethyl methylglutarate and dimethyl ethylsuccinate, and about or less than 1% by weight of solvent of dimethyl adipate. Ex 2 contains dimethyl methylglutarate and dimethyl ethylsuccinate. Control contains dimethyl glutarate, dimethy succinate and dimethyl adipate.

Referring to Table 1, the typical linear dibasic ester, such as AGS-type traditionally utilized (Control), quickly becomes saturated between 4 and 4.8 wt % (by weight of solvent) polystyrene (EPS). The non-linear dibasic ester (Ex 2), and predominantly non-linear dibasic ester (Ex 1), do not become saturated until about 18 wt % (by weight of solvent). This is a 4.5 fold increase in solubility as compared to the AGS-type dibasic ester, which is significant and unexpected.

Experiment 1

As can be seen from FIG. 1, the Control solvent no longer dissolves polystyrene between 4% and 4.8%, which is where the Control solvent became saturated (thus, there are no data points past these respective points). Ex 1 (branched dibasic esters+trace adipate) and Ex 2 (branched dibasic esters) were saturated around 18% (actually between 18% and 18.8%), which is significantly and unexpectedly higher than the Control.

While not being bound by theory, it is believed that the solubility of Ex1 and Ex2 are obtained from the non-linear portion of this mixture and not the linear portion.

TABLE 1

| | Approximate Saturation Concentration of EPS |
|---|---|
| Control (linear DBEs) | 4% |
| Ex 1 (predominantly non-linear DBEs) | 18% |
| Ex 2 (non-linear DBEs) | 18% |

The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A method for reducing the volume of polystyrene foam comprising the steps of:
   contacting a volume reducing agent to polystyrene foam, wherein the volume reducing agent comprises
   a dibasic ester blend comprising a dialkyl methylglutarate and a dialkyl ethylsuccinate, wherein the blend comprises, by weight of the blend:
   (i) from about 80% to about 92% of dialkyl methylglutarate, and
   (ii) from about 3% to about 20% of dialkyl ethylsuccinate,
   whereby the volume reduction agent is capable of collapsing a polystyrene cell to form a compact gel material.

2. The method of claim 1 wherein the volume reducing agent further comprises a surfactant.

3. The method of claim 1 wherein the dibasic ester blend further comprises a dialkyl adipate.

4. The method of claim 2 wherein the surfactant is selected from the group consisting of a terpene alkoxvlate and an alcohol ethoxylate.

5. A method for reducing the volume of polystyrene foam comprising the steps of:
   contacting a volume reducing agent to polystyrene foam, wherein the volume reducing agent comprises:

a dibasic ester of the formula IV:

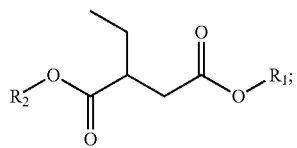

a dibasic ester of formula V:

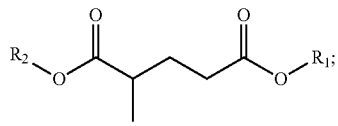

and, optionally, a dibasic ester of formula VI:

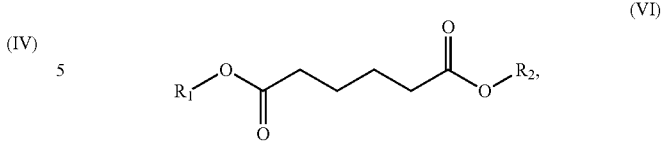

wherein R1 and R2 each individually comprise a hydrocarbon having from about 1 to about 8 carbon atoms,
wherein the blend comprises, by weight of the blend: (i) from about 80% to about 92% of the dibasic ester of formula V:, and (ii) from about 3% to about 20% of the dibasic ester of the formula IV,
whereby the volume reduction agent is capable of collapsing a polystyrene cell to form a compact gel material.

6. The method of claim 2 wherein the surfactant is selected from an alcohol ethoxylate, an alkyl phenol ethoxylate or a terpene alkoxylate.

7. The method of claim 5 wherein the volume reducing agent further comprises a surfactant.

* * * * *